US012466338B2

United States Patent
Hosono et al.

(10) Patent No.: US 12,466,338 B2
(45) Date of Patent: Nov. 11, 2025

(54) VEHICLE EXTERIOR COMPONENT

(71) Applicants: SHIGERU CO., LTD., Ota (JP); SUBARU CORPORATION, Tokyo (JP)

(72) Inventors: Shinsuke Hosono, Ota (JP); Yasuhiko Irie, Tokyo (JP); Miyoshi Itahana, Tokyo (JP)

(73) Assignees: Shigeru Co., Ltd, Ota (JP); Subaru Corporation, Tokyo (JP)

( * ) Notice: Subject to any disclaimer, the term of this patent is extended or adjusted under 35 U.S.C. 154(b) by 439 days.

(21) Appl. No.: 18/140,887

(22) Filed: Apr. 28, 2023

(65) Prior Publication Data

US 2023/0365077 A1 Nov. 16, 2023

(30) Foreign Application Priority Data

May 12, 2022 (JP) ................ 2022-078647

(51) Int. Cl.
*B60R 13/04* (2006.01)
*B29L 31/30* (2006.01)
*B60R 11/00* (2006.01)

(52) U.S. Cl.
CPC ......... *B60R 13/04* (2013.01); *B29L 2031/302* (2013.01); *B29L 2031/3041* (2013.01); *B60R 2011/004* (2013.01)

(58) Field of Classification Search
CPC ............... B60R 13/04; B60R 2011/004; B60R 13/0206; B29L 2031/302; B29L 2031/3041; B62D 25/00–24
See application file for complete search history.

(56) References Cited

U.S. PATENT DOCUMENTS 4,388,355 A * 6/1983 Ikemizu .................. B60R 13/04
293/1
5,340,154 A * 8/1994 Scott ...................... B62D 25/18
280/154

(Continued)

FOREIGN PATENT DOCUMENTS

JP 2010-280246 A 12/2010

OTHER PUBLICATIONS

KR20170073348A with English translation; Cha et al., Jun. 28, 2017 (Year: 2025).*

*Primary Examiner* — Roger L Pang
(74) *Attorney, Agent, or Firm* — Jodi A. Reynolds, Esq.; Harter Secrest & Emery LLP

(57) ABSTRACT

A garnish 10 (exterior component) includes a body 11 having a plate configuration and a plurality of protruded ridges 15, 16 protruded from a back side of the body and extending with a generally constant distance from each other. The garnish 10 is adhesively attached to a vehicle body panel 20 via a shared double-faced adhesive tape 40 adhered to distal end surfaces of the plurality of protruded ridges 15, 16. The plurality of protruded ridges 15, 16 respectively include regions R having curved configurations. Height of the protruded ridge 16 on an inner side varies such that the distal end surface thereof has a wave shape in the region having the curved configuration. Thereby, when a first adhesive surface of the double-faced adhesive tape 40 is adhesively attached to the distal end surfaces of the protruded ridges 15, 16, the release sheet 41 covering a second adhesive surface of the double-faced adhesive tape 40 can be prevented from being subjected to unnatural force and being peeled off the second adhesive surface.

3 Claims, 3 Drawing Sheets

(56) References Cited

U.S. PATENT DOCUMENTS

| | | | |
|---|---|---|---|
| 6,435,602 B1 * | 8/2002 | Sukegawa | B60R 13/0206 52/573.1 |
| 2005/0181173 A1 * | 8/2005 | Hermann | B60R 13/04 156/87 |

* cited by examiner

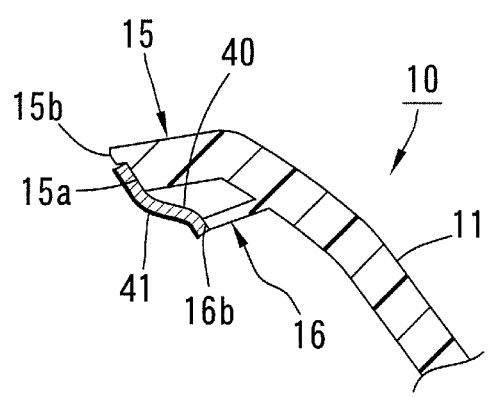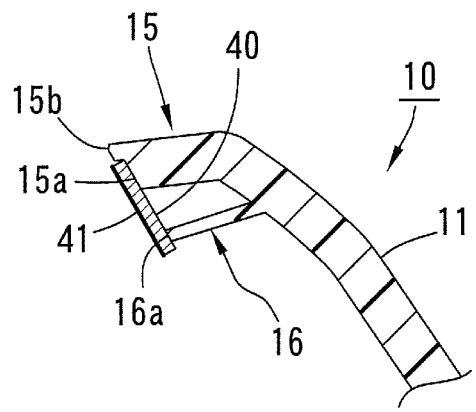
FIG. 5A  FIG. 5B
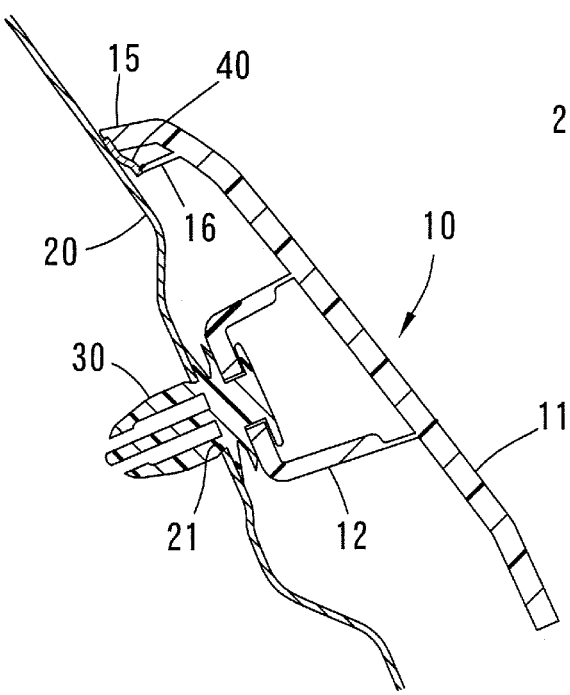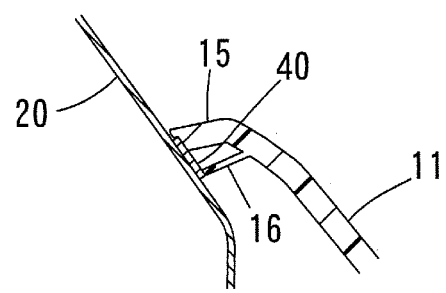
FIG. 6B
FIG. 6A

VEHICLE EXTERIOR COMPONENT

FIELD OF THE INVENTION

The present invention relates to a vehicle exterior component, and particularly relates to an improvement of a structure suitable to be adhesively attached to a vehicle body panel.

BACKGROUND OF THE INVENTION

A vehicle exterior component is fixed to a vehicle body panel with a clip or the like and adhesively attached to the vehicle body panel with a double-faced adhesive tape. A garnish (exterior component) disclosed in Patent Document 1 (Japanese Patent Application Publication No. 2010-280246) includes a plurality of protruded ridges on a back side of a body having a plate configuration. The plurality of protruded ridges extend in a longitudinal direction of the body at a generally constant distance from each other. A first adhesive surface of a shared double-faced adhesive tape is adhesively attached to distal end surfaces of the plurality of protruded ridges. A second adhesive surface of the double-faced adhesive tape is maintained in a state of being covered with a release sheet. The release sheet is removed from the second adhesive surface immediately before the garnish is mounted onto the vehicle body panel. By pressing the garnish against the vehicle body panel, the garnish is adhesively attached to the vehicle body panel via the double-faced adhesive tape.

SUMMARY OF THE INVENTION

Problem to be Solved by the Invention

The plurality of protruded ridges disclosed in Patent Document 1 extend in straight lines or in gentle curves. Therefore, unnatural force is not applied to the release sheet covering the second adhesive surface when the first adhesive surface of the double-faced adhesive tape is adhesively attached to the distal end surfaces of the plurality of protruded ridges. Therefore, the release sheet can be maintained in a state of covering the second adhesive surface of the double-faced adhesive tape without peeling off the second adhesive surface until immediately before executing a step of adhesively attaching the garnish to the vehicle body panel.

However, when the plurality of protruded ridges are curved with a relatively small radius of curvature, unnatural force may be applied to the release sheet covering the second adhesive surface when the first adhesive surface of the double-faced adhesive tape is adhesively attached to the distal end surfaces of the plurality of protruded ridges. It is because in regions having curved configurations, the protruded ridge on an inner side is shorter than the protruded ridge on an outer side. In other words, compressive force in the longitudinal direction is applied to a portion of the release sheet corresponding to the protruded ridge on the inner side. Consequently, the release sheet comes off the second adhesive surface, leaving the second adhesive surface of the double-faced adhesive tape exposed until the garnish is adhesively attached to the vehicle body panel, which may lead to deterioration of an adhesive performance of the double-faced adhesive tape.

Means for Solving the Problems

To solve the problems mentioned above, the present invention provides a vehicle exterior component including a body having a plate configuration; and a plurality of protruded ridges protruded from a back side of the body and extending with a generally constant distance from each other, wherein the vehicle exterior component is adhesively attached to a vehicle body panel via a shared double-faced adhesive tape continuously adhered to distal end surfaces of the plurality of protruded ridges, wherein the plurality of protruded ridges respectively include regions having curved configurations, and wherein in the region having curved configuration, height of the protruded ridge on an inner side varies such that the distal end surface of the protruded ridge on the inner side has a wave shape.

According to the features mentioned above, a difference in length between the protruded portion on the outer side and the protruded portion on the inner side in the regions having curved configurations can be cancelled out or alleviated by forming the distal end surfaces of the protruded portion on the inner side in a wave shape. In this configuration, unnatural force is not applied to a release sheet covering a second adhesive surface when a first adhesive surface of the double-faced adhesive tape is adhesively attached to the plurality of protruded ridges. Thereby, the release sheet can be prevented from peeling off the second adhesive surface. Deterioration of an adhesive performance of the double-faced adhesive tape can be avoided, and the exterior component can be surely adhesively attached to the vehicle body panel.

Preferably, in the regions having curved configurations, the distal end surface of the protruded ridge on an outer side includes a flat surface and crest portions of the wave shape in the distal end surface of the protruded ridge on the inner side are located on a plane extended from the flat surface. According the features mentioned above, in the regions of the plurality of protruded ridges having curved configurations, the crest portions of the protruded ridge on the inner side as well as the protruded ridge on the outer side contribute to adhesively attaching the exterior component to the vehicle body panel.

In one embodiment, the protruded ridge on an outer side comprises a flange disposed on a peripheral edge of the body and the protruded ridge on the inner side comprises a rib that extends along the flange.

Advantageous Effects of the Invention

According to the present invention, a release sheet does not peel off when a shared double-faced adhesive tape is adhesively attached to distal end surfaces of a plurality of protruded ridges having curved configurations in a continuous manner. Thereby, deterioration of an adhesive performance of an exterior component to a vehicle body panel can be prevented.

BRIEF DESCRIPTION OF THE DRAWINGS

FIG. 5A is a cross-sectional view taken along line V-V of FIG. 1, showing the double-faced adhesive tape adhesively attached to the distal end surfaces of the flange and the rib.

FIG. 5B is a cross-sectional view taken along a line shifted from line V-V of FIG. 1 in an extending direction of the flange and the rib, showing the double-faced adhesive tape adhesively attached to the distal end surfaces of the flange and the rib.

FIG. 6A is a cross-sectional view of a portion corresponding to FIG. 5A, showing the garnish mounted on a vehicle body panel via the double-faced adhesive tape.

FIG. 6B is a cross-sectional view of a portion corresponding to FIG. 5B, showing the garnish mounted on the vehicle body panel via the double-faced adhesive tape.

DETAILED DESCRIPTION OF THE INVENTION

Figure 1:
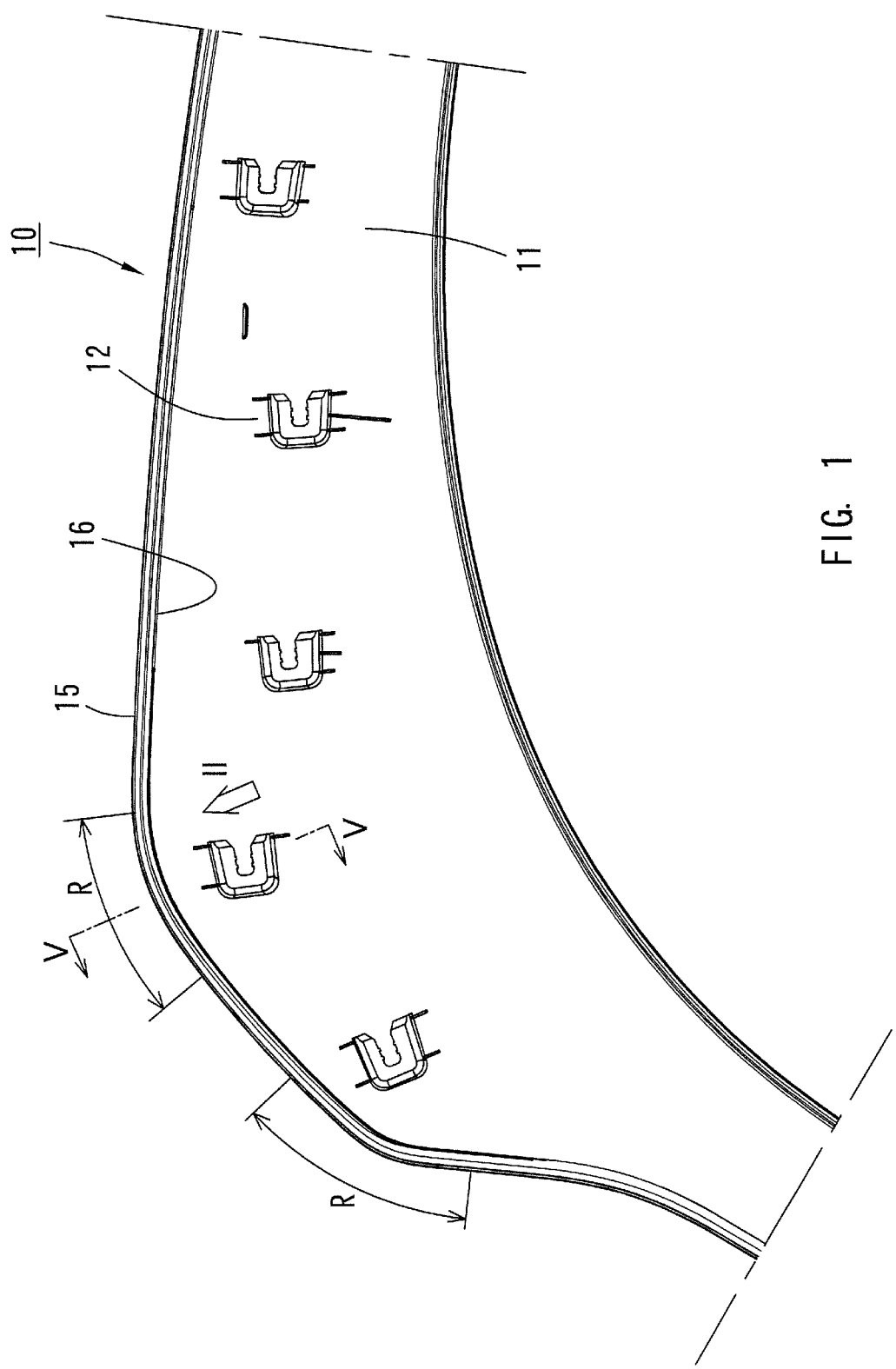
FIG. 1 is a view of a back side of a portion of a garnish according to one embodiment of the present invention.

One embodiment of the present invention will be described hereinafter with reference to the drawings. FIG. 1 is a view of a fender garnish 10 (vehicle exterior component; to be referred to simply as a "garnish" hereinafter), when viewed from a back side. The garnish 10 is made of an injection molded resin and includes a body 11 having a curved plate configuration. A plurality of clip seats 12 integrally formed with the body 11 are dispersedly disposed on a back surface of the body 11.

A flange protruded toward a vehicle body is integrally formed with the body 11 over a generally entire periphery of a peripheral edge of the body 11. In this embodiment, a portion of the flange disposed on an outer edge of the body 11 is provided for adhesive attachment to a vehicle body panel 20 (FIG. 6) to be described later. The portion of the flange (protruded ridge) is indicated with reference numeral 15 in the drawings.

A rib 16 (protruded ridge) is formed in the back surface of the body 11 on an inner side than the flange 15. The rib 16 extends along the flange 15. A distance between the flange 15 and the rib 16 is generally constant over an entire length. The rib 16 is thinner than the flange 15 in this embodiment.

In this embodiment, the flange 15 and the rib 16 respectively include two convex curved regions having small curvatures. The convex curved regions are indicated with reference numeral R. The other portions of the flange 15 and the rib 16 extend in straight lines or gentle curves.

As shown in FIGS. 5A and 5B, a major portion of a distal end surface of the flange 15 is composed of a flat surface 15a. In a state where the garnish 10 is mounted on the vehicle body panel 20 (refer to FIGS. 6A and 6B), the flat surface 15a is opposed to an outer surface of the vehicle body panel 20 with a slight distance therebetween as will be described later. A locating protrusion 15b is formed in the distal end surface of the flange 15 located outside of the flat surface 15a. The locating protrusion 15b extends along the flat surface 15a.

Figure 2:
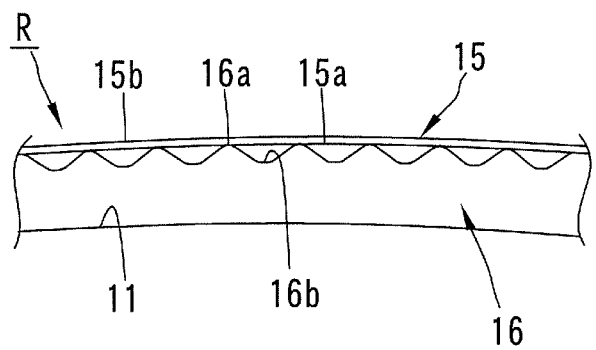
FIG. 2 is a view of a flange and a rib of the garnish, viewed from direction II of FIG. 1

In the portions other than the curved regions R, a distal end surface of the rib 16 is flat and located in a plane extending from the flat surface 15a of the flange 15. As shown in FIGS. 2 and 5, in the curved region, the distal end surface of the rib 16 has a smooth wave configuration, alternately having crest portions 16a and valley portions 16b. The crest portions 16a are located on the plane extending from the flat surface 15a of the flange 15. The valley portions 16b are located below the plane extending from the flat surface 15a.

Figure 3:
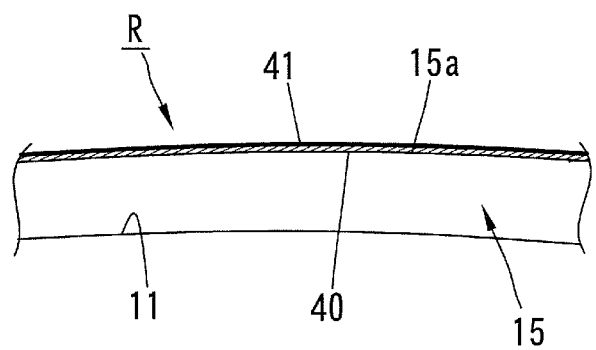
FIG. 3 is a longitudinal-sectional view of the flange, with a double-faced adhesive tape adhesively attached to a distal end surface of the flange.
Figure 4:
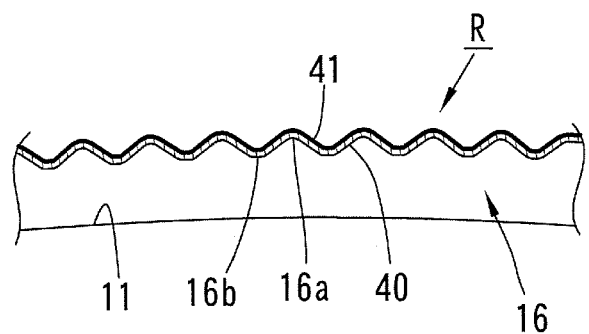
FIG. 4 is a longitudinal-sectional view of the rib, with the double-faced adhesive tape adhesively attached to a distal end surface of the rib.

Clips 30 (refer to FIG. 6A) are respectively mounted in the clip seats 12 of the garnish 10 for mounting the garnish 10 onto the vehicle body panel 20. As shown in FIGS. 3 to 5, one adhesive surface or a first adhesive surface of a shared double-faced adhesive tape 40 is continuously adhered to the flat surface 15a of the flange 15 and the distal end surface of the rib 16 over the entire length including the curved region R. The other adhesive surface or a second adhesive surface of the double-faced adhesive tape 40 is covered with a release sheet 41. In this embodiment, a base material of the double-faced adhesive tape 40 is made of foam material.

In the curved regions R, the rib 16 on the inner side is shorter than the flange 15 on the outer side. Therefore, if the rib 16 had an even height and a flat distal end surface, compressive force in a longitudinal direction would be applied to a portion of the release sheet 41 on the rib 16 side when the first adhesive surface of the shared double-faced adhesive tape 40 is adhered to the flat surface 15a of the flange 15 and the distal end surface of the rib 16. As a result, the release sheet 41 would be peeled off the second adhesive surface of the double-faced adhesive tape 40. However, in this embodiment, the distal end surface of the rib 16 has a wave configuration in the curved regions R. A length of the distal end surface having the wave configuration is longer compared with when the distal end surface is flat. Due to this arrangement, a difference in length between the distal end surfaces of the flange 15 and the rib 16 can be reduced. In other words, the length of the distal end surface of the rib 16 can be made longer than the length of the rib 16, and made generally equal to or closer to a length of the flat surface 15a of the flange 15. Thereby, the release sheet 41 of the double-faced adhesive tape 40 can be prevented from being subjected to an unnatural force and peeled off the second adhesive surface of the double-faced adhesive tape 40 even in the curved regions. Thereby, exposure of the second adhesive surface can be avoided, and an adhesive performance of the double-faced adhesive tape 40 can be maintained in a good condition.

The garnish 10 having the clips 30 mounted thereon and the double-faced adhesive tape 40 adhered thereto as described above is mounted onto the vehicle body panel 20 as shown in FIGS. 6A and 6B. Specifically, the release sheet 41 is released from the second adhesive surface of the double-faced adhesive tape 40 immediately before the mounting work and the garnish 10 is brought closer to the vehicle body panel 20 with the clips 30 and the double-faced adhesive tape 40 facing the vehicle body panel 20. Then, the clips 30 are engaged with engagement holes 21 of the vehicle body panel 20 and the second adhesive surface of the double-faced adhesive tape 40 is adhesively attached to an outer surface of the vehicle body panel 20. The flange 15 is adhesively attached to the vehicle body panel 20 over a generally entire length thereof via the double-faced adhesive tape 40. In the portions other than the curved regions R, the rib 16 also is adhesively attached to the vehicle body panel 20 over a generally entire length thereof via the double-faced adhesive tape 40. In the curved regions R, the crest portions 16a of the rib 16 are adhesively attached to the vehicle body panel 20 via the double-faced adhesive tape 40.

The present invention is not limited to the embodiments described above, and various modifications may be adopted. For example, the plurality of protruded ridges may be formed in portions spaced from the peripheral edge of the body. Three or more protruded ridges may be provided. The present invention can be applied to exterior components other than the garnish.

The invention claimed is:
1. A vehicle exterior component comprising:
a body having a plate configuration; and
a plurality of protruded ridges protruded from a back side of the body and extending with a generally constant distance from each other, wherein the vehicle exterior component is adhesively attached to a vehicle body panel via a shared double-faced adhesive tape continuously adhered to distal end surfaces of the plurality of protruded ridges, wherein the plurality of protruded ridges respectively include regions having curved configurations, and wherein in the region having curved configuration, height of the protruded ridge on an inner side varies such that the distal end surface of the protruded ridge on the inner side has a wave shape.

2. The vehicle exterior component according to claim 1, wherein in the regions having curved configurations, the distal end surface of the protruded ridge on an outer side includes a flat surface and crest portions of the wave shape in the distal end surface of the protruded ridge on the inner side are located on a plane extended from the flat surface.

3. The vehicle exterior component according to claim 1, wherein the protruded ridge on an outer side comprises a flange disposed on a peripheral edge of the body and the protruded ridge on the inner side comprises a rib that extends along the flange.

* * * * *